United States Patent [19]
Hijikata

[11] Patent Number: 5,422,815
[45] Date of Patent: Jun. 6, 1995

[54] NAVIGATION APPARATUS AND NAVIGATION METHOD

[75] Inventor: Makoto Hijikata, Kawagoe, Japan

[73] Assignee: Pioneer Electronic Corporation, Tokyo, Japan

[21] Appl. No.: 165,934

[22] Filed: Dec. 14, 1993

[30] Foreign Application Priority Data

Dec. 14, 1992 [JP] Japan .................. 4-333313

[51] Int. Cl.$^6$ .............................. G06F 15/50
[52] U.S. Cl. ................... 364/449; 364/443; 340/990; 340/995; 73/178 R
[58] Field of Search ............. 364/443, 449; 340/990, 340/995; 73/178 R

[56] References Cited

U.S. PATENT DOCUMENTS

| | | | |
|---|---|---|---|
| 5,046,011 | 9/1991 | Kakihara et al. | 364/449 |
| 5,189,430 | 2/1993 | Yano et al. | 342/457 |
| 5,270,937 | 12/1993 | Link et al. | 364/449 |
| 5,293,318 | 3/1994 | Fukushima | 364/449 |
| 5,311,173 | 5/1994 | Komura et al. | 340/995 |

Primary Examiner—Kevin J. Teska
Assistant Examiner—Susan Wieland
Attorney, Agent, or Firm—Young & Thompson

[57] ABSTRACT

A navigation apparatus is provided with a measurement device for measuring a present position of a movable body, and memory device for storing map data and a map matching device. The map matching device performs map matching on the basis of the present position data and the map data to obtain a plurality of present position candidacies and select a most reliable present position candidacy as a map matched present position among the present position candidacies, and updates present position display data indicating the map matched present position. The navigation apparatus is also provided with a display unit for displaying the map matched present position on a map and for displaying a travelling locus of the movable body on the basis of a plurality of present position display data updated in the past. The navigation apparatus is further provided with a candidacy memory device for storing the present position candidacy data by each group corresponding to one travelling locus, and a travelling locus replacing device for replacing the displayed travelling locus by use of one group of the present position candidacy data.

8 Claims, 4 Drawing Sheets

F I G. 3A
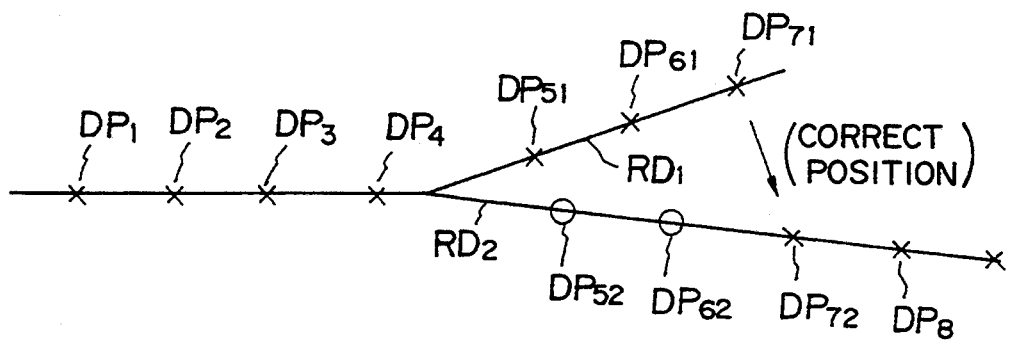
F I G. 3B
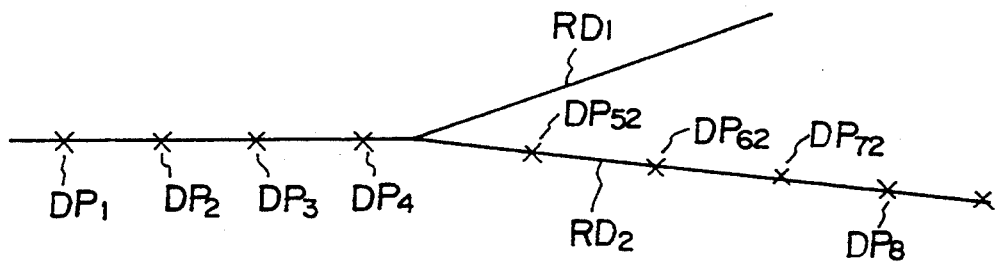
× : PRESENT POSITION DATE USED FOR DISPLAYING TRAVELLING LOCUS

NAVIGATION APPARATUS AND NAVIGATION METHOD

BACKGROUND OF THE INVENTION

1. Field of the Invention

The present invention relates to a navigation apparatus and a navigation method, and more particularly, it relates to a display device of an on-vehicle navigation apparatus.

2. Description of the Related Art

There is a self-sustaining type navigation apparatus as a measurement apparatus for various movable bodies, such as cars, airplanes, vessels, and so on. This self-sustaining type navigation apparatus obtains a two dimensional displacement (vector) of the movable body from azimuth data obtained by an azimuth sensor and speed data obtained by a speed sensor, and then, integrates thus obtained two dimensional displacement with respect to a standard point, so as to obtain the present position. For example, in the case of a car, the navigation apparatus obtains the present position (data) by integrating the integrated travelling distance and the integrated azimuth obtained from a travelling distance sensor and an azimuth sensor respectively, with respect to the standard point. More concretely, for example, the number of rotations of a drive shaft, and the number of pulses generated by the number-of-rotation sensor attached to the drive shaft, are made in correspondence with each other beforehand. The integrated travelling distance is obtained by multiplying a distance correction coefficient to the distance computed from the total number of pulses generated during the time from the standard position to the present position. The integrated azimuth is obtained by integrating the azimuth obtained by the earth magnetism sensor.

There is a GPS (Global Positioning System) navigation apparatus is a measurement apparatus using the artificial satellites. This GPS navigation apparatus normally receives electric waves from three or more GPS satellites, and then, obtains pseudo-distance data including a time offset of the receiver between each GPS satellite and a receiving point (i.e. self-position), position data of each GPS satellite, and the present position (data) of the receiving point.

As an application mode of these measurement apparatuses to an actual GPS navigation apparatus, there is a simple apparatus which indicates latitude and longitude of the present position numerically, and there is also an advanced apparatus which displays various-kinds of data such as a present position, distance to a destination, travelling velocity, etc., on the map displayed on the picture plane of a CRT (Cathode Ray Tube).

The navigation apparatus, which displays various data on the CRT picture plane, reads out map data, which includes the obtained present position, from a memory medium, such as a CD-ROM (Compact Disk—Read Only Memory). Then, the navigation apparatus performs map matching by use of the read map data and the obtained present position data, generates picture-plane data, and displays the self present position, the advancing direction etc. on the map picture plane of the CRT. By this display image, a user can grasp the self present position in relation to the map.

Map matching is explained here.

Digitized map data includes information as for the azimuth and distance as the inclination and length, respectively, of a line segment. The technique of using this information for the azimuth and distance to guess the exact present position, is called map matching. Even if the detected azimuth shifts slightly due to the error of the sensor, if a possibility that the present position is on the road on which the vehicle has been travelling until now, is judged to be high by this map matching, for example, the present position is corrected onto the road, so that an appropriate display without incongruity can be performed.

In order to use or check the travelling history of the vehicle, the above-mentioned navigation apparatus stores the present position data used for the display for every predetermined time interval to a memory, and, by a predetermined operation, connects the present positions, which are stored in the memory and are changing every moment, to display a travelling locus (travelling history).

Apart from that, when performing map matching in a navigation apparatus, two or more present position candidacy data are obtained, and, among these, the present position candidacy data which is judged to be the most probable one i.e. the most reliable one among these, is used as the present position data. Thus, the present position is displayed at real time. The present position data for displaying the position at real time is also used as the present position data for displaying the travelling locus.

Therefore, even when the present position data, which has been judged to be the most probable one at the time of displaying the present position, is judged to exist on a road different from a road on which the vehicle is estimated to have actually travelled by considering the travelling condition afterward, this erroneous present position data is used for displaying the travelling locus without being corrected.

Consequently, there is a problem that a discontinuous portion is generated in the display of the travelling locus, which should be in fact continuous.

SUMMARY OF THE INVENTION

It is therefore an object of the present invention to provide a navigation apparatus, and a navigation method, which can store and display a more exact and continuous travelling locus.

The above object of the present invention can be achieved by a first navigation apparatus including: a measurement device for measuring a present position of a movable body to output present position data; a memory device for storing map data; a map matching device for performing map matching on the basis of the present position data and the map data to obtain a plurality of present position candidacies and select a most reliable present position candidacy as a map matched present position among the present position candidacies, outputting a plurality of present position candidacy data indicating the present position candidacies respectively, and updating present position display data indicating the map matched present position; a displaying unit for displaying a map on the basis of the map data, displaying the map matched present position on the map on the basis of the present position display data, and displaying a travelling locus of the movable body on the basis of a plurality of present position display data which have been updated in the past; a candidacy memory device for classifying the plurality of present position candidacy data into a plurality of groups each corresponding to one travelling locus, and storing the classified present position candidacy data by each group; and a travelling locus replacing device for replacing the displayed travelling locus by use of one group of the present position candidacy data, to which the present position candidacy data corresponding to the updated present position display data belongs, if the one group is different from another group of the present position candidacy data corresponding to the present position display data used previously for displaying the travelling locus.

According to the first navigation apparatus of the present invention, the candidacy memory device stores a plurality of groups of the present position candidacy data, which are candidacies for the present position data, by a unit of the group each corresponding to one travelling locus.

Here, in case that the present position candidacy data, which belongs to one group of the present position candidacy data, is judged by the map matching device to be more reliable than the present position display data used previously for displaying the travelling locus, which belongs to another group, and that the present position display data is updated by use of this more reliable present position candidacy data, the travelling locus replacing device replaces the travelling locus by this one group of the present position candidacy data.

In this manner, since the travelling locus is replaced and displayed by a unit of the group of the present position candidacy data each corresponding to one travelling locus, a discontinuous point does not appear on the travelling locus displayed on the display unit. Thus, it becomes possible to always display more exact and continuous travelling locus, according to the first navigation apparatus of the present invention.

The above object of the present invention can be also achieved by a second navigation apparatus including: a measurement device for measuring a present position of a movable body to output present position data; a memory device for storing map data; a map matching device for performing map matching on the basis of the present position data and the map data to obtain a plurality of present position candidacies and select a most reliable present position candidacy as a map matched present position among the present position candidacies, outputting a plurality of present position candidacy data indicating the present position candidacies respectively, and updating present position display data indicating the map matched present position; a candidacy memory device for classifying the plurality of present position candidacy data into a plurality of groups each corresponding to one travelling locus, and storing the classified present position candidacy data by each group; and a displaying unit for displaying a map on the basis of the map data, displaying the map matched present position on the map on the basis of the present position display data, and displaying a travelling locus of the movable body by use of one group of the present position candidacy data, to which the present position candidacy data corresponding to the present position display data currently updated by the map matching device belongs.

Consequently, in the same manner as the above mentioned first navigation apparatus of the present invention, since the travelling locus is displayed by a unit of the group of the present position candidacy data, a discontinuous point does not appear on the travelling locus displayed on the display unit according to the second navigation apparatus of the present invention.

The above object of the present invention can be also achieved by a navigation method including the steps of:

measuring a present position of a movable body to output present position data; storing map data; performing map matching on the basis of the present position data and the map data to obtain a plurality of present position candidacies and select a most reliable present position candidacy as a map matched present position among the present position candidacies; outputting a plurality of present position candidacy data indicating the present position candidacies respectively; updating present position display data indicating the map matched present position; displaying a map on the basis of the map data, displaying the map matched present position on the map on the basis of the present position display data, and displaying a travelling locus of the movable body on the basis of a plurality of present position display data which have been updated in the past; classifying the plurality of present position candidacy data into a plurality of groups each corresponding to one travelling locus; storing the classified present position candidacy data by each group; and replacing the displayed travelling locus by use of one group of the present position candidacy data, to which the present position candidacy data corresponding to the updated present position display data belongs, if the one group is different from another group of the present position candidacy data corresponding to the present position display data used previously for displaying the travelling locus.

Consequently, in the same manner as the above mentioned first navigation apparatus of the present invention, since the travelling locus is replaced and displayed by a unit of the group of the present position candidacy data each corresponding to one travelling locus, a discontinuous point does not appear on the travelling locus displayed on the display unit. Thus, it becomes possible to always display more exact and continuous travelling locus according to the navigation method of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3, which consist of FIGS. 3A and 3B, are diagrams explaining the operation of the embodiment.

DETAILED DESCRIPTION OF THE PREFERRED EMBODIMENT

Referring to the accompanying drawings, an embodiment of the present invention will be now explained.

Figure 1:
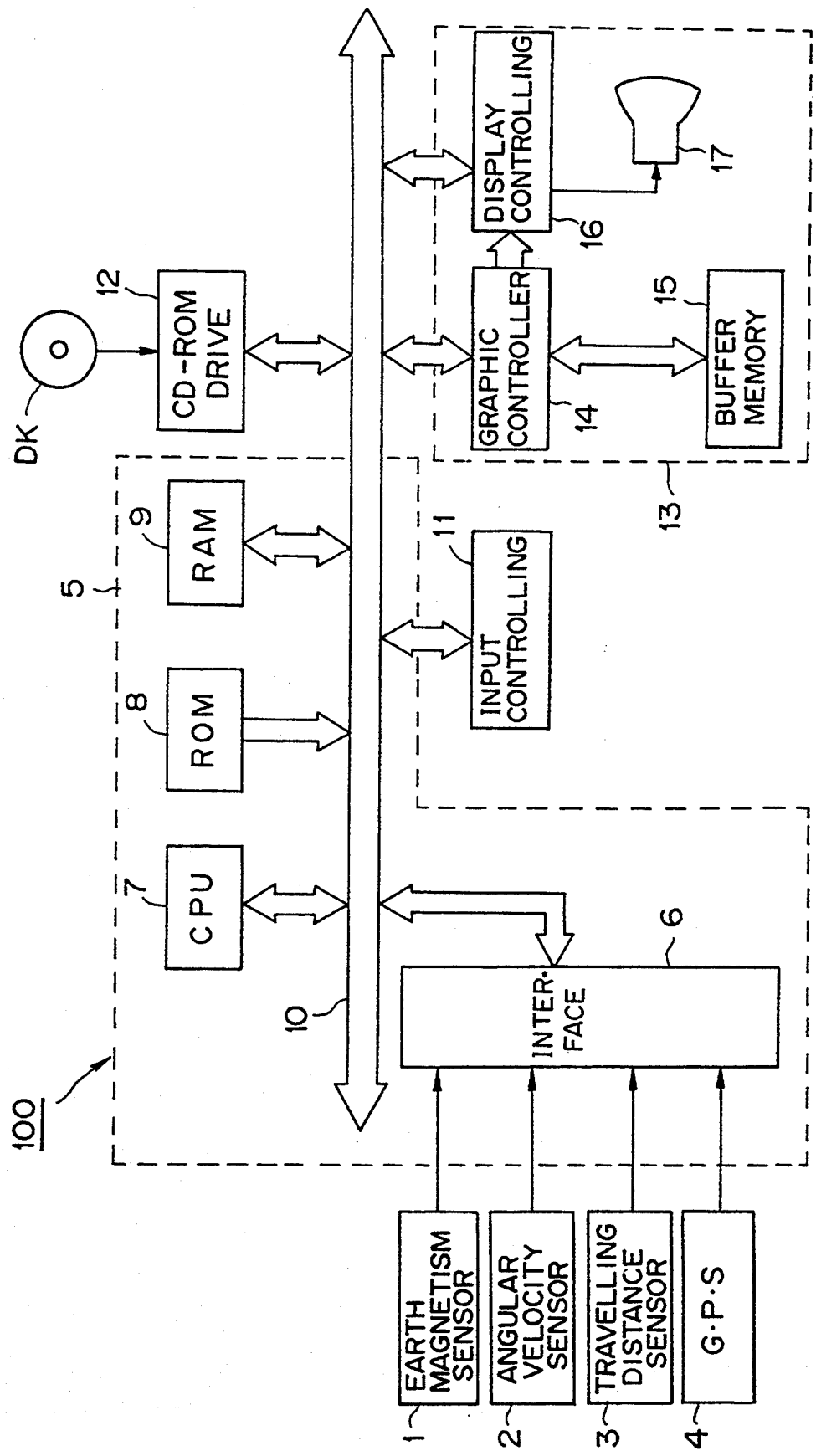
FIG. 1 is a block diagram indicating an outline constitution of a navigation apparatus as an embodiment of the present invention.

FIG. 1 is a block diagram indicating the basic construction of the preferred embodiment of the present invention, applied to an on-vehicle navigation apparatus.

An on-vehicle navigation apparatus 100 is provided with an earth magnetism sensor 1, an angular velocity sensor 2, a travelling distance sensor 3, a GPS receiver 4, a system controller 5, an input controlling device 11, a CD-ROM drive 12, and a display unit 13. The earth magnetism sensor 1 outputs azimuth data of the advancing direction of the vehicle. The angular velocity sensor 2 detects the angular velocity when the vehicle is rotating a drive shaft, and outputs the angular velocity data. The travelling distance sensor 3 outputs travelling distance data by detecting and integrating the number of rotations of the drive shaft. The GPS receiver 4 receives the electric waves from GPS satellites, and outputs GPS measurement data. The system controller 5 controls the whole navigation apparatus on the basis of the azimuth data, the angular velocity data, the travelling distance data and the GPS measurement data. The input controlling device 11 is an apparatus to input various data into the navigation apparatus 100. The CD-ROM drive 12 reads out various data, such as map data, from a CD-ROM disc DK under the control of the system controller 5, and outputs it. It is preferable to store digitized map data to the CD-ROM disk DK, in which the information as for the azimuth and distance are represented by the inclination and length, respectively, of a line segment.

The display unit 13 displays various display data under the control of the system controller 5.

The system controller 5 is provided with an interface section 6, a CPU 7, a ROM 8, and a RAM 9. The interface section 6 performs an interface operation with the external. The CPU 7 controls the whole operation of the system controller 5. The ROM 8 stores the control program which controls the system controller 5. The RAM 9 has a non-volatile memory section, and stores various data in a rewritable manner. The system controller 5 is connected with the input controlling device 11, the CD-ROM drive 12 and the display unit 13 through a bus line 10.

The display unit 13 is provided with a graphic controller 14, a buffer memory 15, a display controlling section 16 and a display device 17. The graphic controller 14 controls the whole operation of the display unit 13 on the basis of control data sent from the CPU 7 through the bus line 10. The buffer memory 15 consists of a memory, such as a VRAM (Video RAM), and stores temporarily image information which can be instantly displayed. The display controlling section 16 performs the display control of the display device 17, such as a liquid crystal display apparatus or CRT, on the basis of picture data outputted from the graphic controller 14.

The measurement of the present position may be performed in the present embodiment by integrating a travelling distance obtained by the travelling distance sensor 3 on a standard position and integrating an azimuth obtained by the earth magnetism sensor 1 on the azimuth at the standard position.

Figure 4:
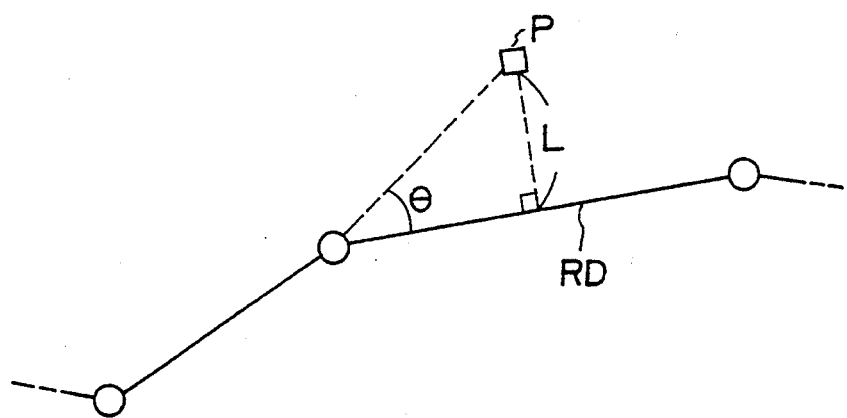
FIG. 4 is another diagram explaining the operation of the embodiment.

Next, the operation of the present embodiment will be explained with reference to FIG. 2 to FIG. 4.

Figure 2:
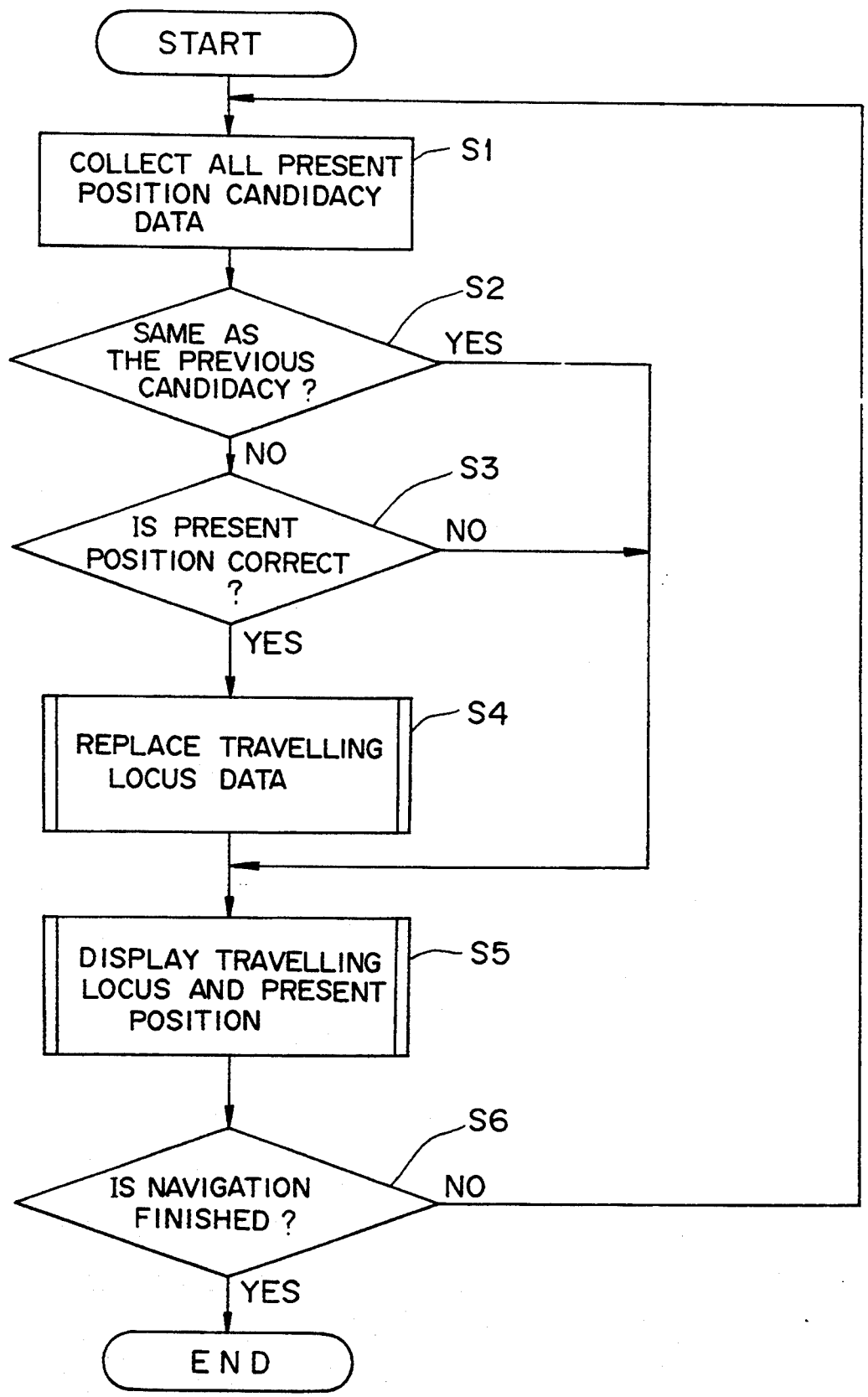
FIG. 2 is a process flow chart of the operation of the embodiment.

FIG. 2 is a process flow chart which indicates an outline operation of the present embodiment.

First, upon performing the map matching, the system controller 5 collects all present position candidacy data that may become present position data. The system controller 5 classifies these data into a plurality of groups of the present position candidacy data, which are considered to be continuous i.e. which are considered to draw one continuous travelling locus, and stores thus classified data into the RAM. 9 (step S1).

More concretely, as shown in FIG. 3A, the system controller 5 distinguishes the first group of the present position candidacy data ($DP_{51}$ to $DP_{71}$) which exist on one road $RD_1$, from the second group of the present position candidacy data ($DP_{52}$ to $DP_{72}$) which exist on another road $RD_2$ located near the road $RD_1$, and stores these data into the RAM 9 in this distinguished condition.

At the same time, the system controller 5 regards the present position candidacy data, which is considered to be the most reliable one among these present position candidacy data, as the present position data, and displays the present position on the display picture plane of the display device 17, by controlling the display unit 13.

Next, the system controller 5 judges whether or not the currently updated present position data belongs to the same group of the present position candidacy data, to which the previous present position data belongs (step S2).

More concretely, as indicated by the present position candidacy data $DP_{72}$ of FIG. 3A, it is judged whether or not the present position data has been drawn onto the road $RD_2$ different from the road $RD_1$, with respect to which the present drawing operation is being performed.

If it is judged that the present position data does not belong to the same group (NO) in the step S2, the process proceeds to a step S3. If it is judged that the present position data belongs to the same group (YES) in the step S2, the flow branches to a step S5.

Then, the system controller 5 judges whether the present position corresponding to the obtained present position data (in the case of the above mentioned example, the present position candidacy data $DP_{72}$) is correct or not, that is to say, whether the reliability of the present position is high or not (step S3). More concretely, as shown in FIG. 4, if the drawing distance L or the drawing angle $\theta$ to the road RD, as one example of a travelling path, of the present position P corresponding to the obtained present position data, is less than a predetermined standard value, it is judged that the present position data is reliable and thus the present position data is regarded to correspond to a correct present position.

If the reliability of the present position corresponding to the obtained present position data is not high, that is to say, if it is judged that the present position is not correct (NO) in the step S3, the flow branches to the step S5.

If the reliability of the present position corresponding to the obtained present position data is high, that is to say, it is judged that the present position is correct (YES) in the step S3, the process proceeds to a step S4. Then, the travelling locus data is replaced by the group of the present position candidacy data, to which the currently updated present position data belongs (step S4). In the case of the above mentioned example, the group of the present position candidacy data ($DP_{51}$ to $DP_{71}$) is replaced by the group of the present position candidacy data ($DP_{52}$ to $DP_{72}$). After that, this group of the present position candidacy data ($DP_{52}$ to $DP_{72}$), is treated as the travelling locus data.

Next, the system controller 5 displays a travelling locus by use of the travelling locus data obtained at the step S4, and displays a present position by use of the new present position data on the display device 17 (step S5).

More concretely, as shown in FIG. 3B, the data $DP_1$ to $DP_4$, $DP_{52}$ to $DP_{72}$ and $DP_8$ are now adopted as the present position data used for displaying the travelling locus.

Next, the system controller 5 judges whether or not the navigation is finished (step S6). If the navigation is finished (YES), the process is ended.

If the navigation is to be successively performed, that is to say, the navigation is not finished (NO), the process returns to the step S1, and the processes from the step S1 to the step S6 are repeated.

As described above in detail, it becomes possible to display more exact present position, and always display more exact and continuous travelling locus, according to the present embodiment.

In the above embodiment, though the case where there are only two groups of the present position candidacy data, has been explained, it is also possible to store more than two groups of the present position candidacy data, select the most reliable group among these groups, and display the travelling locus by the selected group in the same manner.

According to the present embodiment, two or more groups of the present position candidate data, which are candidacies for the present position data, are stored by a unit of the group corresponding to one travelling locus. The travelling locus is replaced use of the group of the present position candidacy data, to which the present position candidacy data presently judged to be the most reliable, belongs. Therefore, no discontinuous point is generated on the travelling locus by map matching, and it becomes possible to always display more exact and continuous travelling locus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus comprising:
    a measurement means for measuring a present position of a movable body to output present position data;
    a memory means for storing map data;
    a map matching means for performing map matching on the basis of the present position data and the map data to obtain a plurality of present position candidacies and selecting a most reliable present position candidacy as a map matched present position among the present position candidacies, outputting a plurality of present position candidacy data indicating the present position candidacies respectively, and updating present position display data indicating the map matched present position;
    a display means for displaying a map on the basis of the map data, displaying the map matched present position on the map on the basis of the present position display data, and displaying a travelling locus of said movable body on the basis of a plurality of present position display data which have been updated in the past;
    a candidacy memory means for classifying the plurality of present position candidacy data, which include the present position candidacy data corresponding to the present position candidacies not selected as the most reliable present position candidacy, into a plurality of groups each corresponding to one travelling locus, and storing the classified present position candidacy data by each group; and
    a travelling locus replacing means for replacing the displayed travelling locus by use of one group of the present position candidacy data, to which the present position candidacy data corresponding to the updated present position display data belongs, if said one group is different from another group of the present position candidacy data corresponding to the present position display data used previously for displaying the travelling locus.

2. A navigation apparatus according to claim 1, wherein said measurement means comprises at least one of an earth magnetism sensor, an angular velocity sensor, a travelling distance sensor and a GPS (Global Positioning System) receiver.

3. A navigation apparatus according to claim 1, wherein said measurement means measures the present position by integrating a travelling distance of said movable body on a standard position and integrating an azimuth of said movable body on the azimuth at the standard position.

4. A navigation apparatus according to claim 1, wherein said memory means comprises a CD-ROM, to which digitized map data are stored.

5. A navigation apparatus according to claim 1, wherein said map matching means selects the most reliable present position candidacy on the basis of a drawing distance of each present position candidacy to a travelling path.

6. A navigation apparatus according to claim 1, wherein said map matching means selects the most reliable present position candidacy on the basis of a drawing angle of each present position candidacy to a travelling path.

7. A navigation apparatus comprising:
    a measurement means for measuring a present position of a movable body to output present position data;
    a memory means for storing map data;
    a map matching means for performing map matching on the basis of the present position data and the map data to obtain a plurality of present position candidacies and for selecting a most reliable present position candidacy as a map matched present position among the present position candidacies, outputting a plurality of present position candidacy data indicating the present position candidacies respectively, and updating present position display data indicating the map matched present position;
    a candidacy memory means for classifying the plurality of present position candidacy data, which include the present position candidacy data corresponding to the present position candidacies not selected as the most reliable present position candidacy, into a plurality of groups each corresponding to one travelling locus, and storing the classified present position candidacy data by each group; and
    a display means for displaying a map on the basis of the map data, displaying the map matched present position on the map on the basis of the present position display data, and displaying a travelling locus of said movable body by use of one group of the present position candidacy data, to which the present position candidacy data corresponding to the present position display data currently updated by the map matching means belongs.

8. A navigation method comprising the steps of:

measuring a present position of a movable body to output present position data;

storing map data;

performing map matching on the basis of the present position data and the map data to obtain a plurality of present position candidacies and selecting a most reliable present position candidacy as a map matched present position among the present position candidacies;

outputting a plurality of present position candidacy data indicating the present position candidacies respectively;

updating present position display data indicating the map matched present position;

displaying a map on the basis of the map data, displaying the map matched present position on the map on the basis of the present position display data, and displaying a travelling locus of said movable body on the basis of a plurality of present position display data which have been updated in the past;

classifying the plurality of present position candidacy data, which include the present position candidacy data corresponding to the present position candidacies not selected as the most reliable present position candidacy, into a plurality of groups each corresponding to one travelling locus;

storing the classified present position candidacy data by each group; and replacing the displayed travelling locus by use of one group of the present position candidacy data, to which the present position candidacy data corresponding to the updated present position display data belongs, if said one group is different from another group of the present position candidacy data corresponding to the present position display data used previously for displaying the travelling locus.

* * * * *